United States Patent
Liu et al.

(10) Patent No.: US 8,749,843 B2
(45) Date of Patent: Jun. 10, 2014

(54) ROBUST RECOGNITION OF CLUSTERS OF STREAKS AT MULTIPLE SCALES

(75) Inventors: Juan Liu, Milpitas, CA (US); Robert Price, Palo Alto, CA (US); Eric S. Hamby, Webster, NY (US)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 233 days.

(21) Appl. No.: 13/443,441

(22) Filed: Apr. 10, 2012

(65) Prior Publication Data

US 2013/0265595 A1 Oct. 10, 2013

(51) Int. Cl.
 G06K 1/00 (2006.01)
 G03G 15/00 (2006.01)
 G06K 9/00 (2006.01)
(52) U.S. Cl.
 USPC ............... 358/1.9; 358/2.1; 399/46; 382/162
(58) Field of Classification Search
 None
 See application file for complete search history.

(56) References Cited

U.S. PATENT DOCUMENTS

| | | | |
|---|---|---|---|
| 5,305,119 A | 4/1994 | Rolleston et al. | |
| 5,528,386 A | 6/1996 | Rolleston et al. | |
| 5,612,902 A | 3/1997 | Stokes | |
| 5,818,960 A | 10/1998 | Gregory, Jr. et al. | |
| 6,005,670 A | 12/1999 | Coleman | |
| 6,304,278 B1 | 10/2001 | Coleman | |
| 6,341,020 B1 | 1/2002 | Rumph et al. | |
| 6,366,358 B1 * | 4/2002 | Satou et al. | 358/1.14 |
| 6,393,161 B1 | 5/2002 | Stevenson et al. | |
| 6,522,431 B1 | 2/2003 | Pitts et al. | |
| 6,571,000 B1 | 5/2003 | Rasmussen et al. | |
| 6,809,837 B1 | 10/2004 | Mestha et al. | |
| 6,972,783 B2 | 12/2005 | Takamatsu et al. | |
| 7,054,568 B2 * | 5/2006 | Mizes et al. | 399/49 |
| 7,120,369 B2 * | 10/2006 | Hamby et al. | 399/49 |
| 7,305,194 B2 | 12/2007 | Thayer | |
| 7,347,525 B2 | 3/2008 | Mizes | |
| 7,388,989 B2 | 6/2008 | Wang | |
| 7,424,169 B2 | 9/2008 | Viassolo et al. | |
| 7,433,539 B2 | 10/2008 | Wang et al. | |
| 7,528,997 B2 | 5/2009 | Gusmano et al. | |
| 7,542,171 B2 | 6/2009 | Viassolo et al. | |
| 7,564,475 B1 * | 7/2009 | Mizes | 347/253 |
| 7,643,678 B2 * | 1/2010 | Mizes | 382/162 |
| 2003/0169437 A1 * | 9/2003 | Priest | 358/1.9 |
| 2005/0036705 A1 | 2/2005 | Viassolo et al. | |
| 2005/0196187 A1 * | 9/2005 | Mizes et al. | 399/49 |
| 2005/0254097 A1 | 11/2005 | Schweid et al. | |
| 2005/0286742 A1 * | 12/2005 | Rasmussen et al. | 382/112 |
| 2006/0001911 A1 | 1/2006 | Viassolo et al. | |

(Continued)

OTHER PUBLICATIONS

Gaurav Sharma, Wencheng Wu, Edul N. Dalal, "The CIEDE2000 Color-Difference Formula: Implementation Notes, Supplementary Test Data, and Mathematical Observations", Submitted to Color Research and Application, Feb. 9, 2004.

(Continued)

*Primary Examiner* — Steven Kau
(74) *Attorney, Agent, or Firm* — Fay Sharpe LLP

(57) ABSTRACT

The present disclosure is generally related to the field of printing, and other processes based on the continuous deposition of material, including industrial molding or extrusion processes, and more particularly to techniques for grouping object quality anomalies in a specified region of an object based on context-specific characterization and shared descriptive profile features.

22 Claims, 6 Drawing Sheets

(56) References Cited

U.S. PATENT DOCUMENTS

| | | | |
|---|---|---|---|
| 2006/0077488 A1 | 4/2006 | Zhang et al. | |
| 2006/0110060 A1 | 5/2006 | Wang et al. | |
| 2006/0187491 A1* | 8/2006 | Sakai | 358/3.27 |
| 2008/0239344 A1 | 10/2008 | Wang et al. | |
| 2009/0003729 A1 | 1/2009 | Metcalfe et al. | |
| 2009/0185204 A1* | 7/2009 | Wu et al. | 358/1.9 |
| 2009/0273813 A1 | 11/2009 | Viturro et al. | |
| 2009/0296158 A1 | 12/2009 | Paul et al. | |
| 2010/0092096 A1 | 4/2010 | Bernal et al. | |
| 2010/0177329 A1* | 7/2010 | Li et al. | 358/1.9 |
| 2010/0220363 A1* | 9/2010 | Paul et al. | 358/3.26 |
| 2011/0058184 A1* | 3/2011 | Ramesh et al. | 358/1.1 |
| 2012/0033238 A1 | 2/2012 | Liu | |

OTHER PUBLICATIONS

Swati Bandyopadhyay, Tapan Paul, Tapasi Roychowdhury and Sivaji Bandyopadhyay, "A new model of printer characterization", IS&T's NIP20: 2004 International Conference on Digital Printing Technologies.

Raja Balasubramanian, The use of spectral regression in modeling halftone color printers, Journal of Electric Imaging, Apr. 1999, vol. 8(2).

De Kleer, J., & Williams, B.C. (1987). "Diagnosing Multiple Faults", Artificial Intelligence (32), 97-130.

Duke, C.B., Noolandi, J., & Thieret, T. (2002). The surface science of xerography. Surface Science (500), 1005-1023.

Liu, J., De Kleer, J. Kuhn, L., Price, B., Zhou, R., & Uckun, S. (2008). "A unified information criterion for evaluating probe and test selection". In International Conference on Prognostics and Health Management (PHM).

Rasmussen, D. R., Dalal, E.N., & Hoffman, K.M. (2001). "Measurement of macro-uniformity: streaks, bands, mottle and chromatic variations". In IS&T's 2001 PICS Conference Proceedings.

Rosario, H. S., Saber, E., Wu, W., & Chandu, K. (2007). "A novel algorithm for detecting streaks in mottled and noisy images", Journal of Electronic Imaging, 16.

S. Mallat and Z. Zhang, "Matching pursuits with time-frequency dictionaries", IEEE Trans. Signal Processing, vol. 41, pp. 3397-3415, Dec. 1993.

S. Chen and D. Donoho, "Basis pursuit", in Proc. $28^{th}$ Asilomar Conf. Signals, System Computation, (Asilomar, CA), pp. 41-44, 1994.

P.S. Huggins and S.W. Zucker, "Greedy basis pursuit", IEEE Trans. Signal Processing, vol. 55, pp. 3760-3772, Jul. 2007.

P. Du, W. A. Kibbe, and S.M. Lin, "Improved peak detection in mass spectrum by incorporating continuous wavelet transform-based pattern matching", Bioinfomatics, vol. 22, No. 17, 2006.

J. Liu and P. Moulin, "Complexity-regularized image denoising", in Proc. Of ICIP '97, (Santa Barbara, CA), pp. II. 370-373, Oct. 1997.

Gaurva Sharma, Digital Color Imaging Handbook, CRC Press, 2003, pp. 150 pgs.

Raja Balasubramanian, "Colorimetric modeling of binary color printers", pp. 1-4, IEEE, Image Processing, vol. 2, Oct. 23-26, 1995, 4 pgs.

Jon Yngve Hardeberg and Francis Schmitt, Color Printer characterization using a computational geometry approach, Proceedings of IS&T and SID's $5^{th}$ Color Imaging Conf: Color Science, Systems and Applications, 1998, 4 pgs.

Raja Balasubramanian, "A spectral neugebauer model for dot-on-dot printers," pp. 1-11, Proceedings SPIE, 1995.

\* cited by examiner

ROBUST RECOGNITION OF CLUSTERS OF STREAKS AT MULTIPLE SCALES

BACKGROUND

The present disclosure is generally related to the field of printing, and other processes based on the continuous deposition of material, including industrial molding or extrusion processes, and more particularly to techniques for grouping object quality anomalies in a specified region of an object based on context-specific characterization and shared descriptive profile features.

In many industrial processes, for example in extrusion or molding processes, the product may contain defects that appear as streaking in the direction of the manufacturing process. For example, the defects might take the form of ridges in the finished material. In the printing industry, the same type or a similar defect may result in dark or light lines across or through the printed image. Different process faults can cause different patterns of streaking in the finished materials. Defects are generally characterized within the printing industry as "streaking" if the defect occurs along the process direction of the printed or manufactured product, or as "banding" or another periodic defect if it appears in the cross-process direction.

Previous work with regard to streaking has focused mainly on detecting the streak or process defect, and on characterizing the streaks or defects, including techniques related to model-based diagnosis. Diagnosis of streaking in industrial processes is largely a manual process that requires trained technicians with direct experience on the equipment in question.

In the printing industry, diagnosis has focused predominantly on streak detection and analysis, and on a clustering-related technique that provides a generic mechanism for the clustering of streaks based solely on visual features. Though these techniques are available for use with regard to identifying streaks, none focus specifically on interpreting the identified streaks. More specifically, no technique provides for focusing on the characterization and classification of streaks using a specific formulation of features for recognizing a cluster of similar streaks, and then for further identifying those streaks in the cluster that share more focused similarities based on a given set of descriptors.

INCORPORATION BY REFERENCE

The disclosure of U.S. patent application Ser. No. 12/849,863, filed Aug. 4, 2010, entitled Method And Apparatus For Characterizing Printer Streaking, by Juan Liu, is incorporated herein by reference in its entirety.

BRIEF DESCRIPTION

The present disclosure is generally related to the field of printing, and other processes based on the continuous deposition of material, including industrial molding or extrusion processes, and more particularly to techniques for grouping object quality anomalies in a specified region of an object based on context-specific characterization and shared descriptive profile features.

In one embodiment, a method is provided for the intelligent characterization and classification of streak patterns, to facilitate diagnosis of the cause of the streaking, using a specific formulation of features for recognizing clusters of streaks. The method efficiently regularizes and automates the diagnosis of common printing anomalies, by detecting clusters of anomalies in a fractal pattern. As such, the method has application to not only printing but also to industrial processes, such as molding or extrusion. The method further is capable of identifying clusters of anomalies that may appear at different scales, potentially within the same product, whether a printed document or an extruded object.

In certain embodiments, the memory and the processor are integrated into a printing system, and the printing system further includes one or more print engines operative to print the test image onto the printable media according to an input characterization data set, as well as a scanner or other means for measuring the test image to generate the characterization data set representing measurements of intensity or color values observed from the test image.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
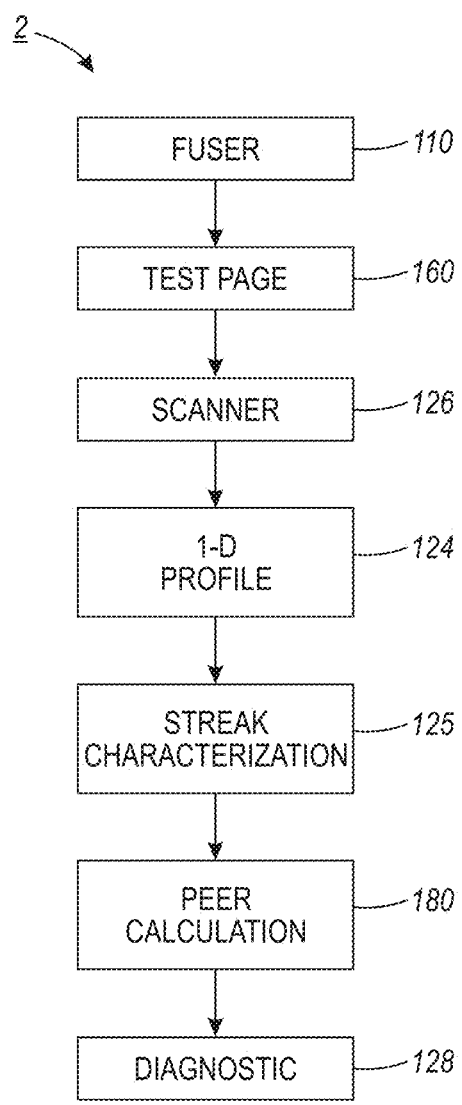
FIG. 1 is a flow diagram illustrating an exemplary printer streak characterization method in accordance with one or more aspects of the disclosure.

The present disclosure provides a method for the intelligent characterization and classification of streak patterns, which may find application in the diagnosis of the cause of the streaking, wherein the characterization and classification of streak patterns is accomplished using a specific formulation of features for recognizing clusters of streaks, and further identifying those streaks within a given cluster that can be grouped based on a specific set of descriptors or features. The method efficiently regularizes and automates the diagnosis of common printing anomalies by the detection of clusters of anomalies in a fractal pattern. The method further is capable of identifying clusters of anomalies that may appear at different scales, potentially within the same product, whether that product is a printed document or an extruded object. As such, the method has application not only to printing processes but also to industrial processes, such as molding or extrusion. The terms "document", "object", and "product" may be used interchangeably herein to the extent that the disclosure provided finds application in both the printing and industrial processing fields, and it is understood that while the following disclosure is presented primarily with regard to the printing field, the principles and techniques provided find equal application in industrial processes based on a continuous deposition of material, such as molding or extrusion.

The system and method provided efficiently identify clusters of anomalies in the process direction, for example by grouping or clustering streaks in parallel lines within a document or object, and within similar scales and having similar features.

Equipment or processing defects in a system may result in anomalies that detract from the quality of the product. For example, a printer defect, whether in the equipment or software, may appear in the printed document as a streak of lighter or darker imaging. The source of the defect or anomaly may be local, e.g. confined to one print head or caused by a scratch or defect on the photoreceptor, or the like, or the defect may appear across all color separations, indicating that the source of the problem may be due to a component or element of the over-all system. The terms "streak", "anomaly", and "defect", whether used in the plural or singular form, may be used interchangeably herein to refer to visible features that detracts from the image quality.

In one embodiment, the method provided and the system for implementing that method, improve upon known anomaly identification systems that identify streaks or anomalies based on a characterization data set representing measurements of certain parameters, such as intensity or color values based on a test image. The method herein then clusters those streaks or anomalies identified by the known system according to like or similar features of the clustered streaks based on a specific set of descriptors. The term "cluster" refers to a grouping of streaks/anomalies/defects based first on location of the streaks and then on the similarity of streak features, as set forth. The term "neighborhood" may be used interchangeably herein with the term "cluster", as will be discussed more fully below.

Within a cluster or neighborhood, individual streaks may be still further classified based a more refined set of descriptors, such that specific streaks may be determined to be "neighbors" or near each other within a defined proximity or distance, and to still more particularly to be "peers", depending on similarities of the descriptors and whether certain criteria, as set forth more fully below, are met.

The first step, then, in the current method and system of identifying streaks or defects can be accomplished using any known streak identification method. One such method is that disclosed in U.S. patent application Ser. No. 12/849,863, filed Aug. 4, 2010, entitled Method And Apparatus For Characterizing Printer Streaking, by Juan Liu, that enables one to identify and characterize individual streaks. In that disclosure, a printing system including one or more printers, operative to print a test image onto printable media is integrated with a memory and processor, as well as a scanner or other means for measuring the test image. Use of the test image, which is printed in 4 half-tones and not fully saturated, allows for a more complete detection and analysis of defects, including not only ink that has been printed where it should not be but also ink that has not been printed where it should be. Using the system, the test image is measured to generate a characterization data set based on intensity and color values observed in the test image. The characterization set is then used to generate a density profile representing variations in the test image in a cross-process direction. The processor is used to determine a descriptor parameter set for a streak template that best approximates the density profile using a basis selection algorithm. Finally, the density profile is updated according to the streak template and the descriptor parameter set. This process is repeated at least one more time in order to generate a streak characterization according to the template and the descriptor set, thus identifying the streaks.

In the current method and system, the streaks identified in the foregoing method are further grouped, characterized and classified. Using a specified set of descriptors, streaks within a defined distance of one another are grouped. Within each group, the streaks are then further grouped according to similarities in features or descriptors, e.g. intensity, color, etc, to form clusters. The presence or lack of similar characteristics within an identified grouping can then be used for further analysis, for example to identify a potential source of the streaking.

Referring now to the drawings, methods and systems are provided for characterizing printer streaking using a basis selection algorithm, with further characterization based on the use of a defined set of descriptors to group image quality anomalies. The exemplary printing system and method 2 of FIG. 1 is illustrated and described below in the form of a series of acts or events. However, the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated method 2, moreover, may be implemented in hardware, processor-executed software, or combinations thereof, whether in a single characterization system or in distributed form in two or more components or systems, in order to characterize streaking in a printing device, and may be employed in conjunction with any form of printing system, including without limitation desktop printers, network printers, stand-alone copiers, multi-function printer/copier/facsimile devices, high-speed printing/publishing systems digital printing presses, etc., or to any industrial processing system and method, wherein the disclosure is not limited to the specific applications and implementations illustrated and described herein.

By way of general over-view, FIG. 1 provides a flow diagram of an exemplary printer system including the method and system disclosed herein for streak characterization. The process or method 2 that may be implemented includes a characterization system 124 shown in FIGS. 2-5, where the characterization systems 124/180 can be separate or may be integrated into a printing system 100 for implementing the process or method 2. As seen in FIGS. 2-5, exemplary printing systems or devices 100 include system controllers 122 and streak characterization systems or engines 124/180 in which the method 2 may be implemented.

With more specific reference to FIG. 1, there is provided a flow diagram of an anomaly detection and analysis system and method, including features in accord with the foregoing. The method and system may include those processing steps and systems in accord with FIGS. 2-5 which may or may not be illustrated in the flow diagram of FIG. 1, including for example those features of such systems that are shown to operate in advance of fuser 110. It is understood, that any or all such features, though not shown, may be included as part of the method and system shown in the flow diagram. As such, fuser 110 receives a print pattern or printed image. If an image anomaly is sensed or recognized, a test page 160 may be generated for further characterization of the image 162, including any anomaly or streak that may be present. This test page may then be scanned by scanner 126 for further processing and characterization of the streak(s) in systems 124 and 180.

An algorithm is then performed, and based on this analysis characterization engine 124 generates a 1-dimensional profile representing the analyzed image 125. The characterization system analyzes the image profile to generate a streak characterization 125, the results of which are processed by peer calculation system 180, as discussed more fully below, to identify peers of a given streak 181, followed by identification of streak clusters 183, in accord with a transitive closure operation 182. The final characterization of the image may then be transmitted to, for example, diagnostic engine 128, or be employed by an operator or technician, to identify potential or actual sources of the print image anomaly. This information may also be used to conduct automated reconfiguration, for testing and/or quality control, or for other useful operations regarding print image quality.

Figure 2:
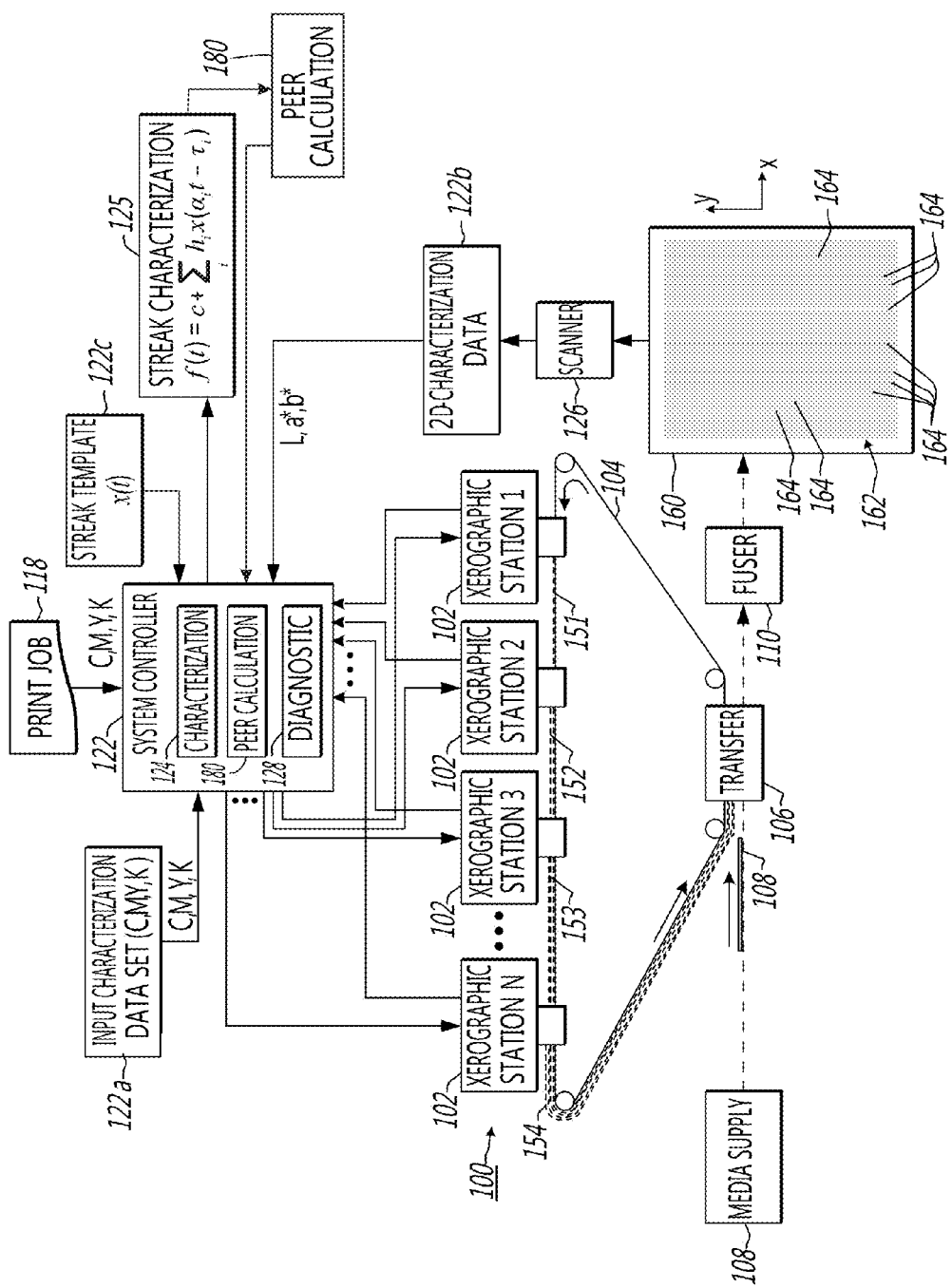
FIGS. 2 and 3 are simplified schematic system level diagrams illustrating exemplary multi-color document processing systems with a printer streak characterization system in accordance with one or more aspects of the disclosure.

The exemplary color processing devices or printing systems 100 in FIGS. 2-5 include xerographic stations (print engines) 102 which operate to produce visible images according to input color data. The printing systems 100 also include a system controller 122 which provides input data to the print engines 102 according to a print job 118, as well as a scanner type sensor 126 that generates measured data 122b representative of the perceivable spectral content of printed visible images 162 printed onto printable media 108. This data generates a streak characterization 125 which is then used for a peer calculation 180 that groups streaks based on similar parameters or descriptors. The scanner 126 in certain embodiments may be integrated into the printing system 100 for in-line scanning of printed images 162 on test pages 160. The system 100 in FIG. 2 is a tandem multi-color document processing device with marking devices 102 individually operable according to control signals or data from the controller 122 to transfer toner marking material 151-154 onto an intermediate substrate 104 that may or may not be a photoreceptor, in this case, a shared intermediate transfer belt (ITB) 104 traveling in a counter clockwise direction in the figure past the xerographic marking devices 102 (also referred to as marking engines, marking elements, marking stations, etc.). In other embodiments, a cylindrical drum may be employed as an intermediate transfer substrate, with the marking devices 102 positioned around the periphery of the drum to selectively transfer marking material thereto. In addition, this could be used for other marking or display technologies, such as ink jet, DRT, LCD, projectors, etc.

Figure 3:
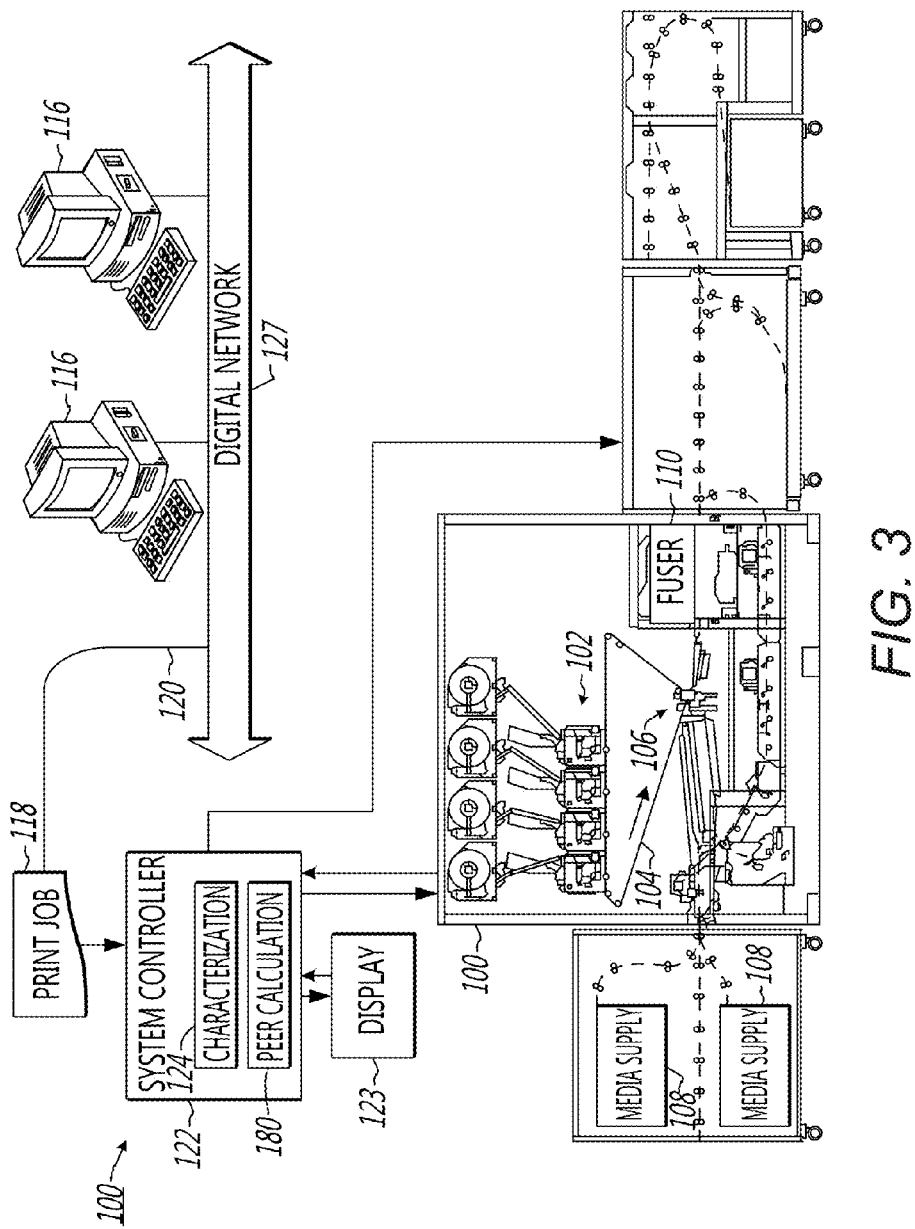

FIG. 3 shows another exemplary system 100 having four marking devices 102 configured along a shared or common intermediate transfer belt 104, along with a transfer station 106, a supply of final print media 108, and a fuser 110. In normal operation, print jobs 118 are received at the controller 122 via an internal source such as an in-line or outboard scanner 126 (FIG. 2) and/or from an external source, such as one or more computers 116 connected to the system 100 via one or more networks 124/180 (FIG. 3) and associated cabling 120, or from wireless sources. The print job execution may include printing selected text, line graphics, images, magnetic ink character recognition (MICR) notation, etc., on the front and/or back sides or pages of one or more sheets of paper or other printable media. In this regard, some sheets 108 may be left completely blank in accordance with a particular print job 118, and some sheets may have mixed color and black-and-white printing. Execution of the print job 118, moreover, may include collating the finished sheets 108 in a certain order, along with specified folding, stapling, punching holes into, or otherwise physically manipulating or binding the sheets 108. In certain embodiments the system 100 may be a stand-alone printer or a cluster of networked or otherwise logically interconnected printers with an associated display 123 (FIG. 3), with each printer having its own associated print media source 108 and finishing components including a plurality of final media destinations, print consumable supply systems and other suitable components. Alternatively the system may include multiple marking engines 102 with a common media supply 108 and common finishers that are configured either serially or in parallel (separate parallel paper paths between feeding and finishing).

Figure 4:
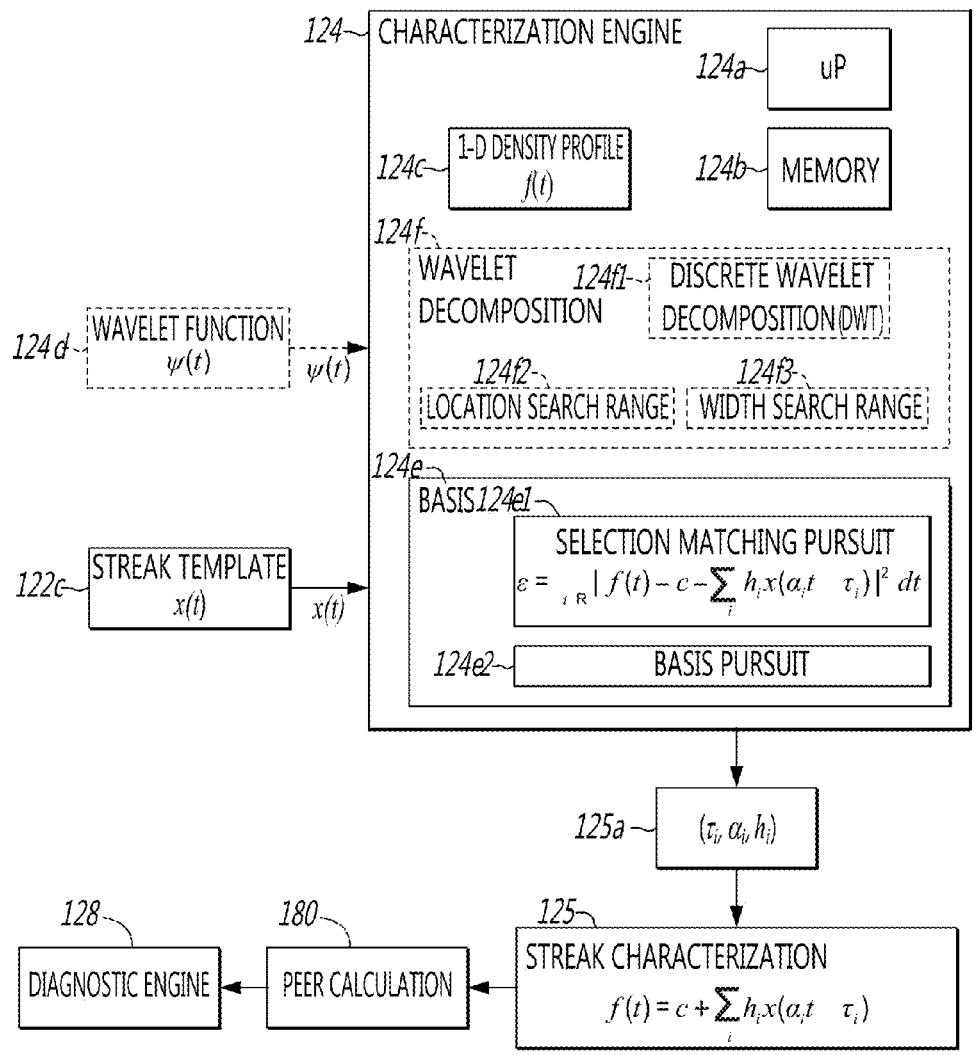
FIG. 4 is a schematic diagram illustrating further details of the streak characterization system of FIGS. 2 and 3 in accordance with one or more aspects of the disclosure.
Figure 5:
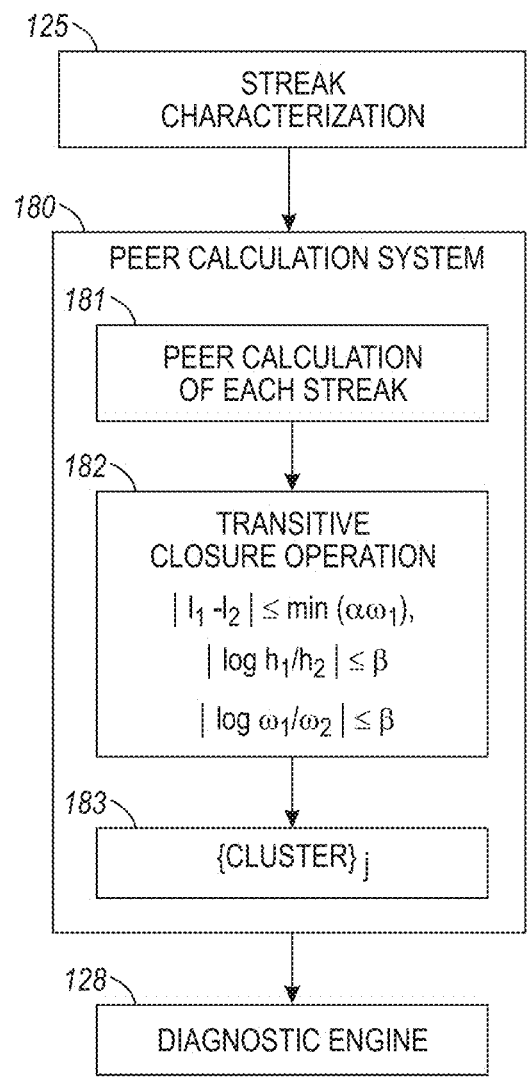
FIG. 5 is a schematic diagram illustrating further details of the streak characterization system of FIG. 4 in accordance with one or more aspects of the disclosure.

Referring also to FIG. 4, characterization systems or characterization engines 124 and 180 are operatively coupled with (and may be implemented integrally to) the system controller 122, and the controller 122 may further include a diagnostic component or engine 128 (FIGS. 2, 4 and 5). In certain embodiments, the characterization systems 124/180 are implemented as processor-based systems having suitable processing and memory components programmed or configured to implement the characterization process 2 and other functionality as described herein.

As best shown in FIG. 4, the characterization system 124 includes a processing element 124a and memory 124b and employs suitable program instructions and/or dedicated or programmable logic to perform the streak characterization functionality described herein, and may perform other tasks. In operation, the streak characterization system 124 receives a characterization data set 122a. In certain embodiments, the input characterization data set 122a is a uniform selected color or gray scale shade for printing one or more ideally uniform test patch images 162 onto a test page 160 (FIG. 2) for characterizing streaking problems in the printing system 100. Thus, for the case of no printer streaking or banding, the test patch 162 should appear on the printed test page 160 as a uniform patch. However, as shown in FIG. 2, if the printing system 100 suffers from one or more streak-causing problems, the printed test patch 162 includes one or more visible streaks 164 extending along the process direction (vertical streaks along the "y" direction in FIG. 2), where the streaks may be lighter or darker than the desired color or shade of the input characterization data set 122a, and may have different widths along a cross-process direction (e.g., the "x" direction in FIG. 2) which is transverse to the process-direction.

The scanner 126 (FIG. 2) scans the printed test image and provides a two-dimensional (2-D) measured characterization data set 122b which represents measurements of observed intensity or color. As shown in FIGS. 2-4, the test patch 162 is measured using the scanner 126 to generate the measured characterization data set 124b, which is provided to the characterization system 124 as shown in FIG. 4.

The characterization system 124 in FIG. 4 is provided with a streak template $x(t)$ 122c (e.g., defining a template waveform such as a raised cosine or half-cosine shape, a block-wave function, or other shape), as well as an optional wavelet function $\psi(t)$ 124d for wavelet decomposition, such as a Mexican hat-shaped function, a Daubechies-shaped wavelet function, or other suitable function for performing optional wavelet decomposition. In certain embodiments, a wavelet function is selected which has a similar shape to that of the streak template $x(t)$.

As best seen in FIG. 4, the characterization system 124 in certain embodiments includes various data and functional components that may be implemented using the processor 124a and the memory 124b, including a one-dimensional (1-D) density profile 124c derived from the 2-D measured characterization data set 122b using averaging or integration in certain embodiments and representing color value variation of the test image 162 in the cross-process direction (x) of the printing system 100, as well as a basis selection component 124e and an optional wavelet decomposition component 124f. The basis selection component 124 can implement one or more basis selection algorithms for determining descriptor parameter sets 125a (tuples $(\tau, \alpha, h)$) to characterize printer streaking using matching pursuit 124e1, basis pursuit 124e2, or other basis selection techniques. The optional wavelet decomposition component 124*f* includes a discrete wavelet decomposition component 124*f*1 (discrete wavelet transform or DWT) which can be advantageously employed in certain embodiments to expedite the basis selection by identifying location search ranges 124*f*2 and 124*f*3 for location and width parameters. The characterization system 124 provides a characterization 125 of printer streaking based on the tuples or sets 125*a*, which may then be further characterized with regard to clusters and specific peer groups 180.

Figure 6:
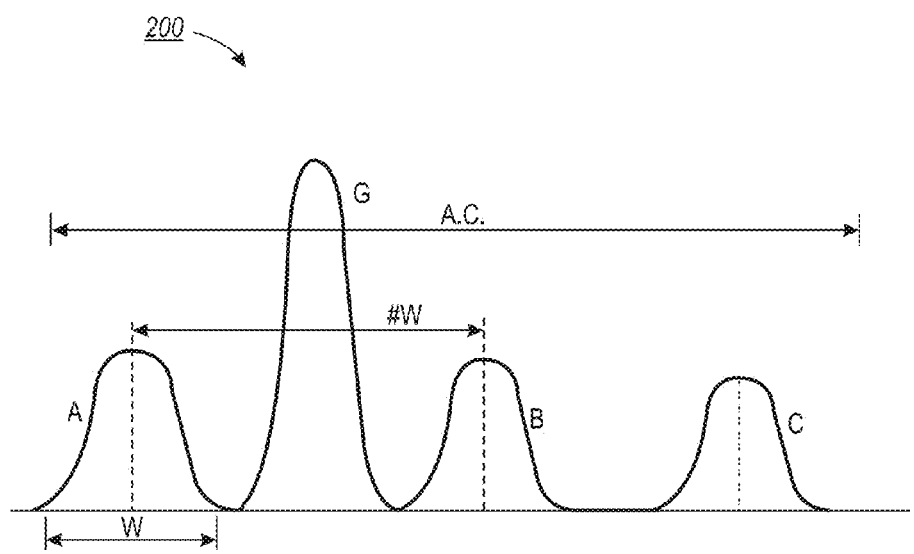
FIG. 6 is a 1-dimensional wave diagram in accordance with one or more aspects of the disclosure.

With further reference to FIGS. 4 and 5, peer calculation system 180 receives the streak characterization 125 generated by the streak characterization system 124, as represented by a 1-dimensional wave diagram such as that shown in FIG. 6, based on the specified set of descriptor tuples ($l_i$, $h_i$, $w_i$). A peer calculation 181 is then performed on each streak ("S") characterized by streak characterization system 124 as shown in streak characterization 125, to identify all streaks that may potentially be grouped or clustered. In looking for streaks that may be included in a cluster, the system only considers those streaks that fall within a specified distance of a given streak. This distance, shown on FIG. 6 as the absolute cut-off (AC) distance, correlates to DPI sensitivity, i.e. the visual field generally accepted as readily identifiable by human vision. A default absolute cut-off is determined, and only those streaks within this absolute cut-off distance or field are considered for inclusion in the same cluster or neighborhood.

Once the system 181 has identified those streaks that appear within the absolute cut-off, the system looks at each streak relative to a given streak (S) to identify all peers ($S_i$) of that streak, wherein i=1, . . . N, where N is the number of peers found by the clustering algorithm. The peers are then evaluated according to a defined set of criteria to determine if a coherent grouping exists among the peers, e.g. do any of the peers share similar width, height (intensity) and crispness. Only streaks that have the same or similar parameter tuples may be clustered. The peers ($S_i$) are further evaluated to determine the relative closeness of each peer (streak) to the given streak (S). In this regard, "relative closeness" is generally defined as a distance equal to about 2-3.5 times the width of the given streak (S). Peers that are within the defined relative closeness are considered to be neighbors. The clustering process is completed by a transitive closure operation 182 to define all peers sharing common parameters, and being neighbors within a defined relative distance of each other. This cluster diagnosis 183 is then provided by peer calculation system 180 to the diagnostic engine 128.

With more particular reference now to FIG. 6, there is shown a 1 dimensional wave diagram, such as that generated by streak characterization 125 wherein each wave represents a streak for which an analysis of the defined parameters or criteria has been conducted. The current system and method, in one embodiment, provide a mechanism for the analysis and comparison of streaks within a specified field, i.e. within the absolute cut-off as previously defined, based on objective criteria. The use of objective criteria provides an advantage over some analytical processes based in whole or in part on human observation. By nature, any two people may identify the same streak differently, e.g., while one may assess a streak as being wide, another may assess the same streak as being medium in width, or even as not existing at all. Therefore, there is a high probability that such human analyses may be inconsistent or inaccurate. Further, the human eye can detect streaks to only a certain sensitivity, e.g. to only a certain DPI. In order to reduce such inconsistency or inaccuracy, the method and system provided employ a defined set of descriptors, and using the provided algorithm, perform calculations resulting in the identification and characterization of clusters of streaks sharing common descriptor features, thereby providing consistent diagnostic information regarding system or process operation or performance.

In accord with the presently disclosed embodiment, a key discriminating feature of streaks is whether they form clusters or appear as isolated phenomena. Streaks that appear in clusters and share common features may be an indication of a common problem. For example, an electrical system defect may cause a ripple in the systems electrical field that shows up on a printed image as a grid-type streak pattern. Conversely, an individual streak, sharing no commonality with other streaks within the cluster may represent a more localized problem such as a print-head issue or a scratched print drum. The system and method provided herein automatically clusters streaks based on aggregated features, or descriptors, of the identified streaks and provides the same to diagnostic software where the grouping can be interpreted to identify streak source. Further, the method and system provided cluster streaks on multiple scales, potentially within the same product.

As set forth above, the method and system provided analyze identified streaks within the context of the image in which they appear. By this is meant that each identified streak is compared to every other streak within a defined proximity as determined in accord with the provided descriptors, principally location, height, width, and crispness. This process is used to ultimately group or cluster identified streaks in accord with the identification of similarity of features or descriptors.

In one embodiment, streaks that have been identified and characterized by characterization system 124 (see FIGS. 2-4) are further analyzed for possible inclusion in a cluster 180 based on two criteria: 1) a context—specific notion of closeness of the component streaks, i.e., proximity or how far apart the streaks appear; and 2) the notion that streaks share descriptive properties.

With reference to FIGS. 5 and 6, the first criterion used to cluster streaks is based on proximity, which may also be referred to as location (l). One level of proximity or location identification employs an absolute cut-off distance (AC) for a given analysis defined as the maximum distance within which a streak must appear to be considered for inclusion in a cluster. Streaks within the absolute cut-off are considered neighbors, i.e. are within a neighborhood. This distance (AC) may be provided to the peer calculation system 180 by an operator, may be a predetermined value programmed into the system as a default parameter, may be determined based on an initial set of measured descriptors, or may be provided from another source. Based on the foregoing, all streaks/waves shown in FIG. 6 are considered to be potential peers of A, or neighbors of A, and therefore are considered to be within A's "neighborhood", which is a term used herein to define all streaks within the absolute cut-off of the proximity of a given streak S.

Those streaks within the defined neighborhood are further characterized in accord with the second criterion to determine if they are considered peers. This second criterion requires that two streaks be within a defined relative distance of one another. The relative distance between streaks is determined, as shown in FIG. 6, based on the distance between the vertical center of one streak and the vertical center of any other streak within the neighborhood. A predetermined number of streak widths based on the width, W, of a given streak, for example streak A in FIG. 6, defines the relative distance away from streak A that a neighboring streak can be for consideration as a potential peer of streak A. For example, if streak A has a width, W, of 1 mm, only those streaks within several millimeters, for example within about 2 mm to about 3.5 mm, preferably within about 2.25 mm to about 3 mm, e.g. about 2.5 mm, of streak A would be considered close enough to potentially be a peer A and populate the same cluster. Similarly, a streak having a width of about 10 mm would be considered "close" to a neighboring streak so long as the neighboring streak is within tens of millimeters of the first streak, i.e., within about 20 mm to about 30 mm, preferably about 25 mm, of the streak having the 10 mm width. Those streaks that meet the closeness criteria defined by the system are considered potential peers and may populate a cluster if all criteria are met.

The next step in the determination of peers that may be clustered in accord with the presently disclosed embodiment is the determination of shared descriptive features, e. g. crispness (sharp, blurry), width, and intensity (height). Those streaks that share common descriptors are then concluded to be peers and are aggregated or clustered. In one embodiment, the method provides for setting application specific thresholds on similarity of descriptors in order to allow irrelevant candidates to be filtered out of a cluster. Streaks that pass the application specific threshold are grouped greedily, or readily, into clusters. That is, the closest and most similar streaks are clustered or grouped first, followed by the inclusion in the cluster or group of streaks that are close, but are less similar, which are grouped second. Similarities in the descriptors of clustered streaks may indicate a common source of the streaking or anomaly. Conversely, if streaks that share common descriptors are identified but are too far apart, intuitively it may be recognized that an artifact that should be present, e.g. another streak, is not, which may indicate a different kind of problem. The grouping or clustering of streaks may be additive or subtractive in nature.

An example scenario in keeping with the foregoing follows. In FIG. 6, streak A is shown to have a width W. Streak B is shown to be within about 2.5 widths, W, of streak A, and as such is established as a potential peer of streak A based on the first criteria noted above, i.e., that the streaks in question be within a certain proximity, or within a number of widths, #W, to one another. Also shown in FIG. 6 is streak C, which is within the absolute cut-off, AC, of streak A and therefore within the neighborhood 200. Streak C is not, however, within the required number of widths, #W, away from streak A to be a potential peer of streak A. Looking at streak B, it is seen that streak C is within the required number of widths, #W, of streak B to be a potential peer of streak B. Therefore, streaks A, B, and C each meet criteria 1 and fall within neighborhood 200.

Also shown in FIG. 6 is streak G. While streak G is within the required number of widths, #W, to be a potential peer of streak A according to the first criteria, it does not meet the second criteria stating that peers share descriptors. It is easily seen that streak G is much narrower than streak A, as well as much taller than streak A. Streak G differs from streaks B and C for the same reasons. Therefore, though streak G meets criteria 1, it does not meet criteria 2 and is not a peer of any of streaks A, B, or C. The peer relationship of the streaks in neighborhood 200 can be stated as follows:

Peer (A)={B}
Peer (G)={ }
Peer (B)={A, C}
Peer (C)={B}

Based on the transitive closure operation, the neighborhood 200 includes 2 cluster groups: group 1 including peers A, B, and C, and group 2 including G. Accordingly, the streak analysis in accord herewith may identify clusters as follows: {cluster}$_j$, wherein j=1, . . . j, and j is the number of clusters produced by the clustering algorithm. With regard to the foregoing, a cluster, j, having three streaks, corresponding to streaks A, B, and C of FIG. 6 has been characterized.

Based on the foregoing, the criteria for determining neighbors and peers in accord with an embodiment of the presently disclosed invention can be summarized as follows. For any streak, the system establishes a set of streak descriptors, for example location, $l_1$; height, $h_1$; and width, $w_1$. Similarly, for any second streak there is a second set of descriptors established, location, $l_2$; height, $h_2$; and width, $w_2$, and so on for each additional streak. Using these descriptors, calculations according to the following equations are conducted based on: closeness of location, l, of streaks based on a constant factor, $\alpha$, times streak width, w; where location should be close:

$$|l_1 - l_2| \leq \min(\alpha w_1);$$

and on closeness in streak height, h, of streaks, such that $h_1$ and $h_2$ are within a constant factor, $\beta$, of one another, for example:

$$|\log h_1/h_2| \leq \beta;$$

and similarly on closeness in streak width, w, of streaks, such that $w_1$ and $w_2$ are within a constant factor, $\beta$, of one another, for example:

$$|\log w_1/w_2| \leq \beta.$$

In that instance where the current method is used to identify clusters in a printed image, the method allows for grouping not only within a single color separation, but also across all color separations. Therefore, the method can be used to identify a potential problem or source that affects not just one print color, which may indicate a problem with a particular printhead, nozzle, etc. for example, but may also identify a problem across all color separations, which may indicate a potential problem within the system in general upstream of the print-heads. As such, the current method may be used not only to identify imaging issues, but also to focus on potential sources of a given image quality issue.

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be

The invention claimed is:

1. A method of grouping image quality anomalies of an image, the method comprising:
    a) printing a test image onto a printable media according to an input characterization data set using a printing system;
    (b) measuring the test image to generate a characterization data set representing measurements of intensity or color values observed from the test image;
    (c) generating a density profile using the characterization data set, the density profile representing intensity or color value variation of the test image in a cross-process direction transverse to a process direction of the printing system;
    (d) operating a processor to determine a descriptor parameter set for a streak template that approximates the density profile using a basis selection algorithm, the descriptor parameter set including:
        a location parameter, l, in the cross-process direction,
        a width parameter, w, in the cross-process direction, and
        an intensity parameter, h, at the location;
    (e) updating the density profile according to the streak template and the descriptor parameter set;
    (f) generating a printer streak characterization according to the streak template and the descriptor parameter sets;
    (g) based on the printer streak characterization, selecting a region of the image to be analyzed, the region defining an absolute cut-off distance within which a streak must be located to be a part of a grouping;
    (h) selecting a streak within the region against which all streaks will be compared; and
    (i) analyzing all remaining streaks within the region using a transitive closure operation, such that streaks that meet the following criteria for determining similarity can be grouped, the criteria consisting of:
        1) location of a streak within a predefined relative distance of the streak selected in step (h); and
        2) similarity of the streak from step (i)(1) as compared to the streak selected in step (h) based on the descriptor parameter set determined in step (d);
wherein the streaks are then grouped according to the following rule:

$|l_1 - l_2| \leq \min(\alpha w_1)$, wherein $(\alpha w_1)$ is the cut-off distance $|\log h_1/h_2| \leq \beta$ $|\log w_1/w_2| \leq \beta$.

2. The method of claim 1, wherein clusters represent similar streaks in the process direction of the image.

3. The method of claim 1, wherein the relative distance is from about 2.25 to about 3.0 times the width of the streak selected in step (h).

4. The method of claim 1, wherein clusters are identified in fractal fashion.

5. The method of claim 1, wherein a single image may contain clusters of different scale.

6. The method of claim 1, including the further step of using the results of step (i) to support diagnostic applications.

7. The method of claim 1, wherein the descriptor parameter set is determined using a matching pursuit basis selection algorithm.

8. The method of claim 1, where generating the density profile comprises averaging or integrating the characterization data set.

9. The method of claim 1, where the test image is printed according to an input characterization data set representing a uniform selected color or gray scale shade.

10. A printer streak characterization system for characterizing and grouping printer streaks, the system comprising:
    a printing system including a memory and a processor;
    the memory storing a characterization data set representing measurements of intensity or color values observed from an image printed in a printable media;
    the processor operative to generate a density profile using the characterization data set, the density profile representing intensity or color value variation of the image in a cross-process direction transverse to a process direction of the printing system;
    the processor being operative to determine a descriptor parameter set for a streak template that approximates the density profile using a basis selection algorithm, the descriptor parameter set including:
        a location parameter in the cross-process direction,
        a width parameter in the cross-process direction, and
        an intensity parameter at the location;
    the processor being operative to update the density profile according to the streak template and the descriptor parameter set;
    the processor being operative to generate a printer streak characterization according to the streak template and the descriptor parameter sets;
    the processor being operative to compare streaks within a relative distance of each other on the image based on the descriptor set of each streak that has been characterized; and
    the processor being operative to group similar streaks.

11. The printer streak characterization system of claim 10, where the memory and the processor are integrated into the printing system, the printing system comprising:
    at least one print engine operative to print the test image onto a printable media according to an input characterization data set; and
    means for measuring the test image to generate the characterization data set representing measurements of intensity or color values observed from the test image.

12. The printer streak characterization system of claim 10, where the processor is operative to determine the descriptor parameter set using a matching pursuit basis selection algorithm.

13. The printer streak characterization system of claim 10, where the processor is operative to determine the descriptor parameter set for a streak template by performing a discrete wavelet decomposition using the density profile and a wavelet function to generate:
    a location search range for the location parameter along the cross-process direction; and
    a width parameter search range for the width parameter along the cross-process direction;
    where the processor is operative to restrict the basis selection algorithm according to the location search range and the width parameter search range.

14. The printer streak characterization system of claim 10, where the test image is printed according to an input characterization data set representing a uniform selected color or gray scale shade.

15. A method of grouping defects in a processed object, the method comprising:

a) processing the object according to an input characterization data set using a processing system;
b) measuring the object to generate a characterization data set representing measurements of intensity or color values observed from the object;
c) generating a density profile using the characterization data set, the density profile representing intensity or color value variation of the object in a cross-process direction transverse to a process direction of the processing system;
d) operating a processor to determine a descriptor parameter set for a streak template that best approximates the density profile using a basis selection algorithm, the descriptor parameter set including:
   a location parameter in the cross-process direction,
   a width parameter in the cross-process direction, and
   an intensity parameter at the location;
e) updating the density profile according to the streak template and the descriptor parameter set;
f) generating a streak characterization according to the streak template and the descriptor parameter set;
g) based on the streak characterization, selecting a region of the object to be analyzed, the region defining an absolute cut-off distance within which a streak must be located to be a part of a grouping;
h) selecting a streak within the region against which all streaks will be compared; and
i) analyzing all remaining streaks within the region using a transitive closure operation, such that streaks that meet the following criteria for determining similarity can be grouped, the criteria being:
   1) location of a streak within a predefined relative distance of the streak selected in step (h); and
   2) similarity of the streak of step (i)(1) as compared to the streak selected in step (h) based on the descriptor parameter set determined in step (d);

wherein the streaks are then grouped according to the following rule:

$|l_1 - l_2| \leq \min(\alpha w_1)$, wherein $(\alpha w_1)$ is the cut-off distance $|\log h_1/h_2| \leq \beta$ $|\log w_1/w_2| \leq \beta$.

16. The method of claim 15, wherein the processing system is an extrusion system.

17. The method of claim 15, wherein the processing system is a molding system.

18. The method of claim 15, wherein clusters represent similar streaks in the process direction of the object.

19. The method of claim 15, wherein the relative distance is from about 2.25 to about 3.0 times the width of the streak selected in step (h).

20. The method of claim 15, wherein clusters are identified in fractal fashion.

21. The method of claim 15, wherein a single object may contain clusters of different scale.

22. The method of claim 15, including the further step of using the results of step (i) to support diagnostic applications.

* * * * *